US012651612B2

(12) United States Patent
Kimura et al.

(10) Patent No.: US 12,651,612 B2
(45) Date of Patent: Jun. 9, 2026

(54) MAGNETIC RECORDING AND REPRODUCTION DEVICE AND CONTROL METHOD OF THE SAME

(71) Applicants: Kabushiki Kaisha Toshiba, Tokyo (JP); Toshiba Electronic Devices & Storage Corporation, Tokyo (JP)

(72) Inventors: Kaori Kimura, Yokohama Kanagawa (JP); Takao Furuhashi, Kawasaki Kanagawa (JP); Masaya Suzuki, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/986,562

(22) Filed: Dec. 18, 2024

(65) Prior Publication Data

US 2026/0031108 A1     Jan. 29, 2026

(51) Int. Cl.
G11B 23/50     (2006.01)
G11B 5/60     (2006.01)
G11B 5/00     (2006.01)

(52) U.S. Cl.
CPC .......... G11B 23/505 (2013.01); G11B 5/6011 (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,887,336 A | 3/1999 | Watanabe | |
| 7,301,719 B1 | 11/2007 | Chen et al. | |
| 8,721,903 B2 | 5/2014 | Bian et al. | |
| 9,171,554 B2 * | 10/2015 | Tomikawa | G11B 33/14 |
| 9,349,407 B2 | 5/2016 | Guo et al. | |
| 9,761,262 B2 | 9/2017 | Hsia et al. | |
| 9,852,754 B1 | 12/2017 | Martin et al. | |
| 10,199,067 B1 | 2/2019 | Gan et al. | |
| 10,319,397 B2 | 6/2019 | Ryun et al. | |

(Continued)

FOREIGN PATENT DOCUMENTS

| | | | | |
|---|---|---|---|---|
| CN | 117251386 A | * 12/2023 | ......... | G06F 12/0246 |
| JP | H08249652 A | 9/1996 | | |

(Continued)

OTHER PUBLICATIONS

English Text of Xu et al., CN 11725138 A (Year: 2023).*
U.S. Appl. No. 18/596,531, filed Mar. 5, 2024.

*Primary Examiner* — Peter Vincent Agustin
(74) *Attorney, Agent, or Firm* — Kim & Stewart LLP

(57) ABSTRACT

According to an embodiment, a control method for a heat-assisted magnetic recording and reproducing device including a heat-assisted magnetic recording head including a main pole, a near-field transducer generating near-field light, a waveguide propagating light to the near-field transducer, and a laser light source supplying light to the waveguide, and a heat-assisted magnetic recording medium that has a lubricant layer on a recording surface opposing the head, includes irradiating the near-field light on the medium with a second laser current value set lower than a first laser current value at a time of write, and operating the head, thereby performing a smoothing process on the surface of the lubricant layer.

19 Claims, 12 Drawing Sheets

(56)                References Cited

U.S. PATENT DOCUMENTS

|  |  |  |  |  |
|---|---|---|---|---|
| 12,223,988 | B1 | 2/2025 | Kimura |  |
| 2001/0048568 | A1* | 12/2001 | Ikeda | G11B 5/59633 |
| 2002/0029460 | A1* | 3/2002 | Aoki | G11B 5/84 |
|  |  |  |  | 29/603.07 |
| 2002/0181337 | A1* | 12/2002 | Takao | G11B 5/672 |
| 2003/0086200 | A1* | 5/2003 | Tokizono | G11B 5/5521 |
|  |  |  |  | 360/78.08 |
| 2004/0107426 | A1* | 6/2004 | Sato | G11B 5/127 |
| 2006/0092549 | A1* | 5/2006 | Ishii | G11B 5/5547 |
|  |  |  |  | 360/75 |
| 2010/0002329 | A1 | 1/2010 | Hsia et al. |  |
| 2010/0074062 | A1* | 3/2010 | Kamijima | G11B 5/314 |
|  |  |  |  | 369/13.14 |
| 2011/0238781 | A1* | 9/2011 | Okun | H04L 67/06 |
|  |  |  |  | 709/217 |
| 2013/0146562 | A1 | 6/2013 | Guo et al. |  |
| 2013/0264306 | A1 | 10/2013 | Bian et al. |  |
| 2016/0329074 | A1 | 11/2016 | Karis et al. |  |
| 2017/0221511 | A1 | 8/2017 | Dai et al. |  |
| 2017/0360409 | A1 | 12/2017 | Susumu |  |
| 2018/0336921 | A1 | 11/2018 | Ryun et al. |  |
| 2019/0392863 | A1* | 12/2019 | Fukushima | G11B 5/656 |
| 2020/0365183 | A1 | 11/2020 | Matsumoto |  |
| 2021/0090605 | A1 | 3/2021 | Suzuki et al. |  |
| 2021/0201941 | A1 | 7/2021 | Hyodo |  |
| 2021/0256996 | A1 | 8/2021 | Ohtake et al. |  |
| 2021/0287701 | A1 | 9/2021 | Kudo |  |
| 2022/0051693 | A1 | 2/2022 | Hyodo |  |
| 2023/0063493 | A1 | 3/2023 | Matsumoto et al. |  |
| 2024/0096349 | A1 | 3/2024 | Isokawa et al. |  |
| 2024/0321293 | A1 | 9/2024 | Matsumoto |  |
| 2024/0321312 | A1 | 9/2024 | Kimura et al. |  |
| 2025/0078868 | A1* | 3/2025 | Jubert | G11B 5/85 |

FOREIGN PATENT DOCUMENTS

|  |  |  |  |
|---|---|---|---|
| JP | 2783181 | B2 | 8/1998 |
| JP | 2010003350 | A | 1/2010 |
| JP | 2017221511 | A | 12/2017 |
| JP | 2020187815 | A | 11/2020 |
| JP | 2021047951 | A | 3/2021 |
| JP | 2021106063 | A | 7/2021 |
| JP | 2021131918 | A | 9/2021 |
| JP | 2021149978 | A | 9/2021 |
| JP | 2022032269 | A | 2/2022 |
| JP | 2022148647 | A | 10/2022 |
| JP | 2023031619 | A | 3/2023 |
| JP | 2024044496 | A | 4/2024 |
| JP | 2024134253 | A | 10/2024 |
| JP | 2024135927 | A | 10/2024 |
| JP | 2025-44548 | A | 4/2025 |

* cited by examiner

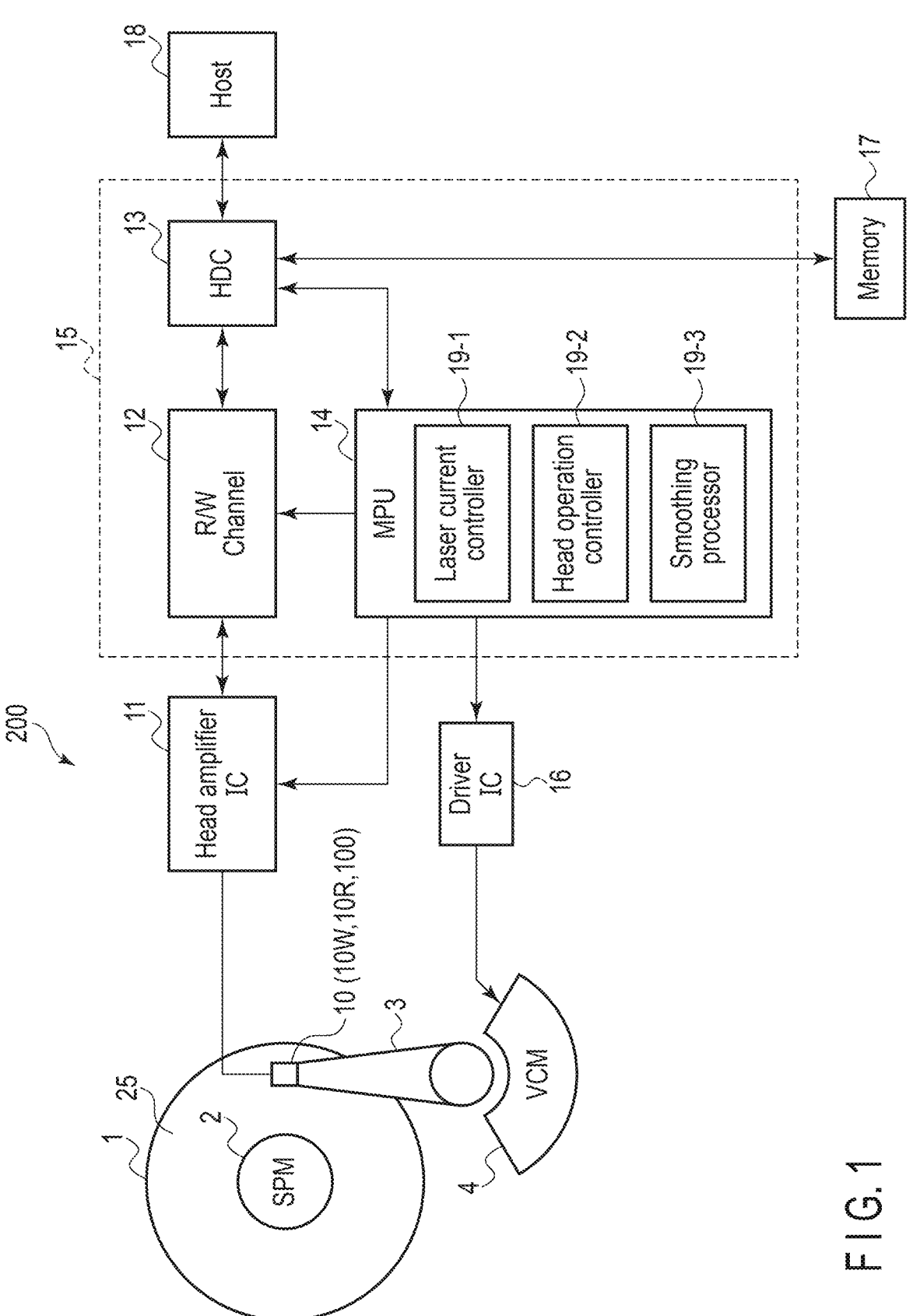
F I G. 1

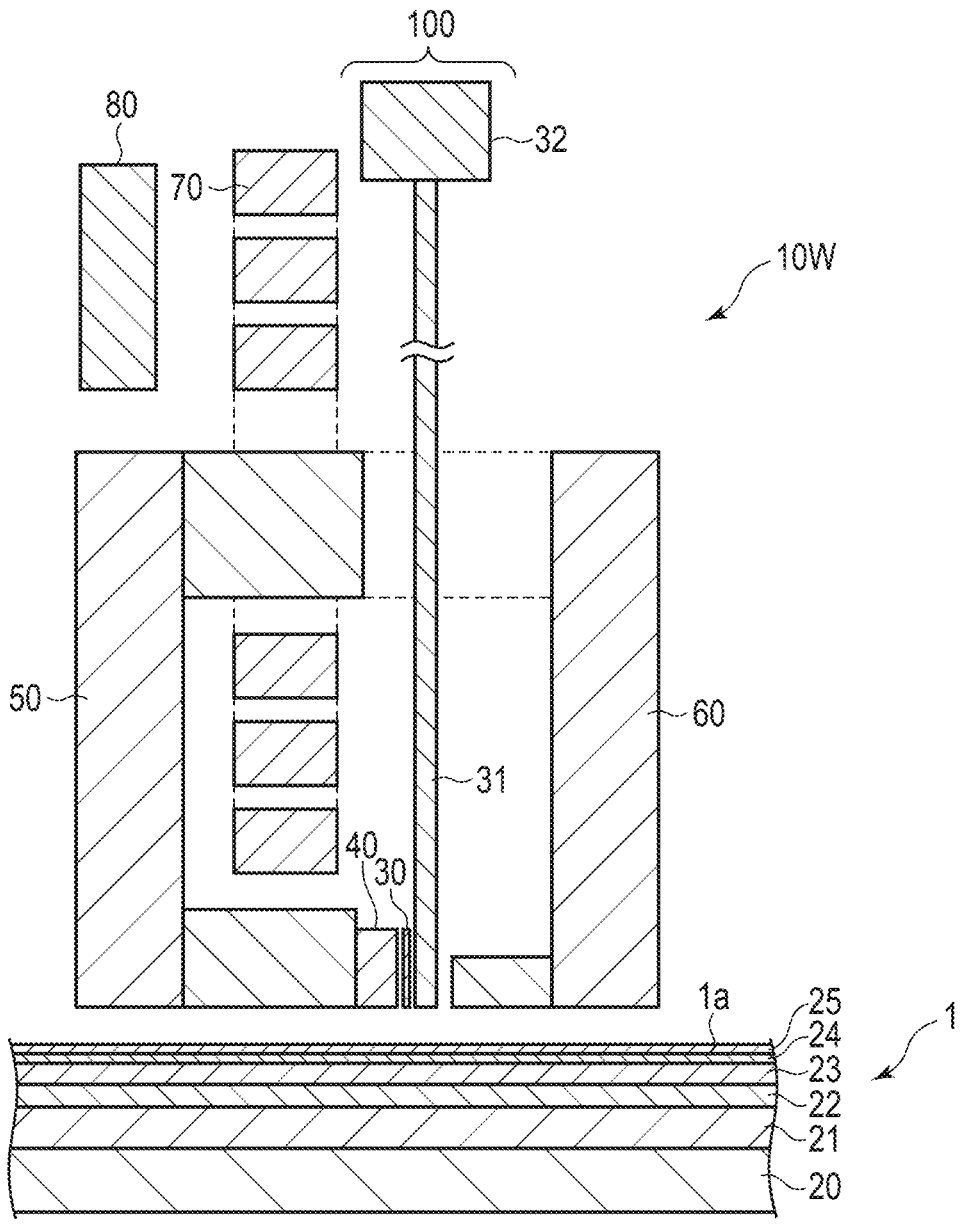
F I G. 4

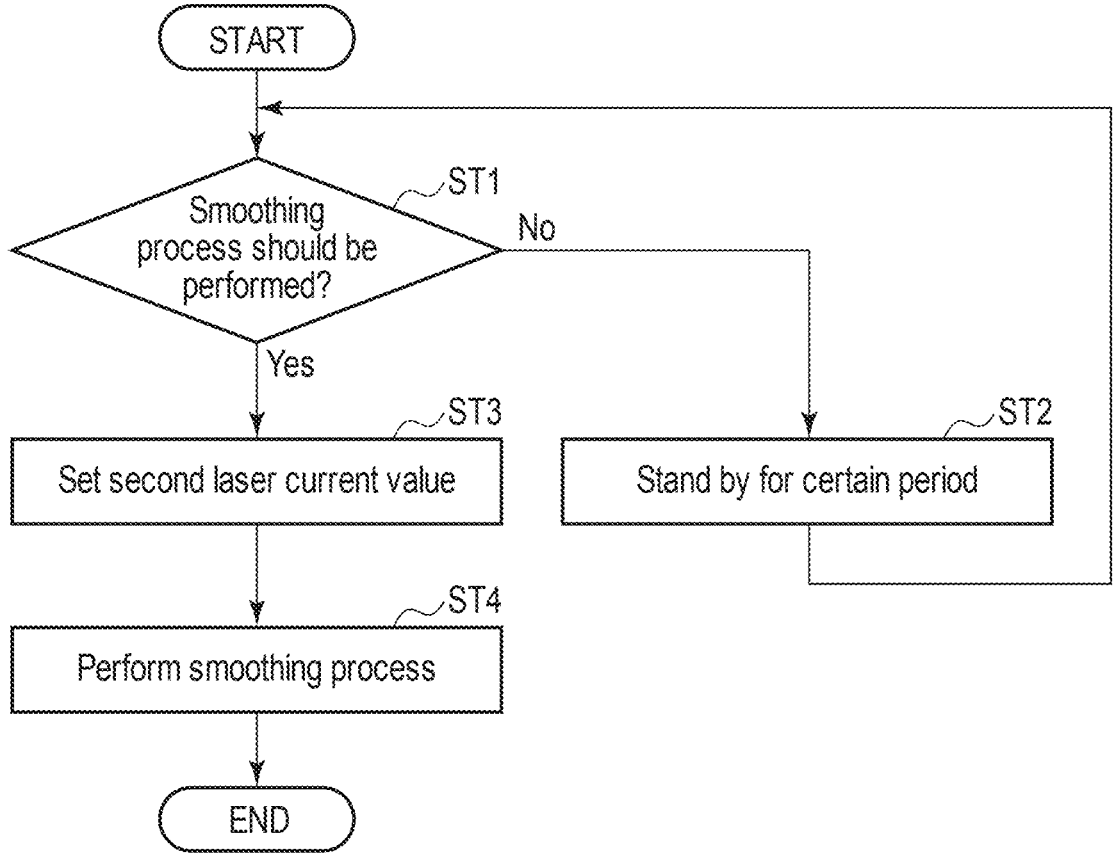
F I G. 5

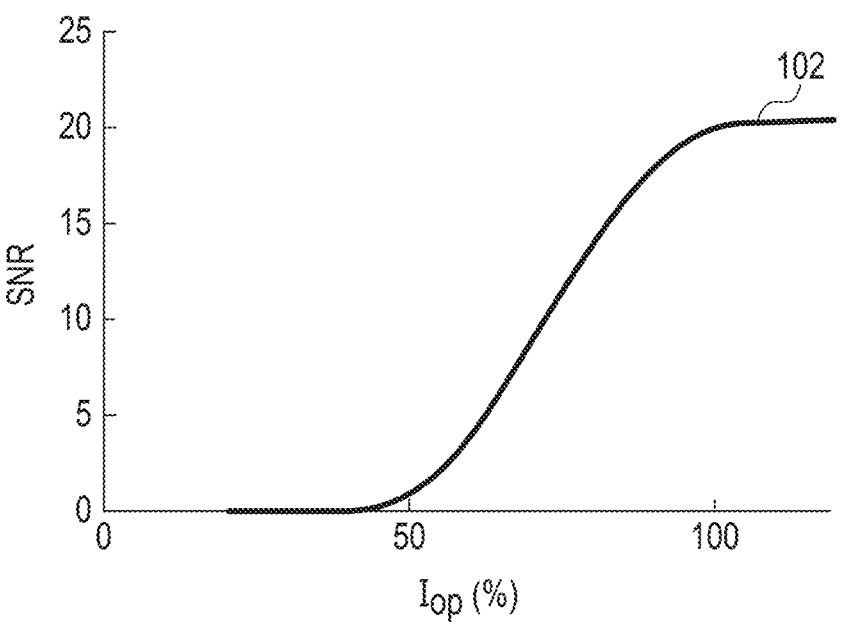
F I G. 10
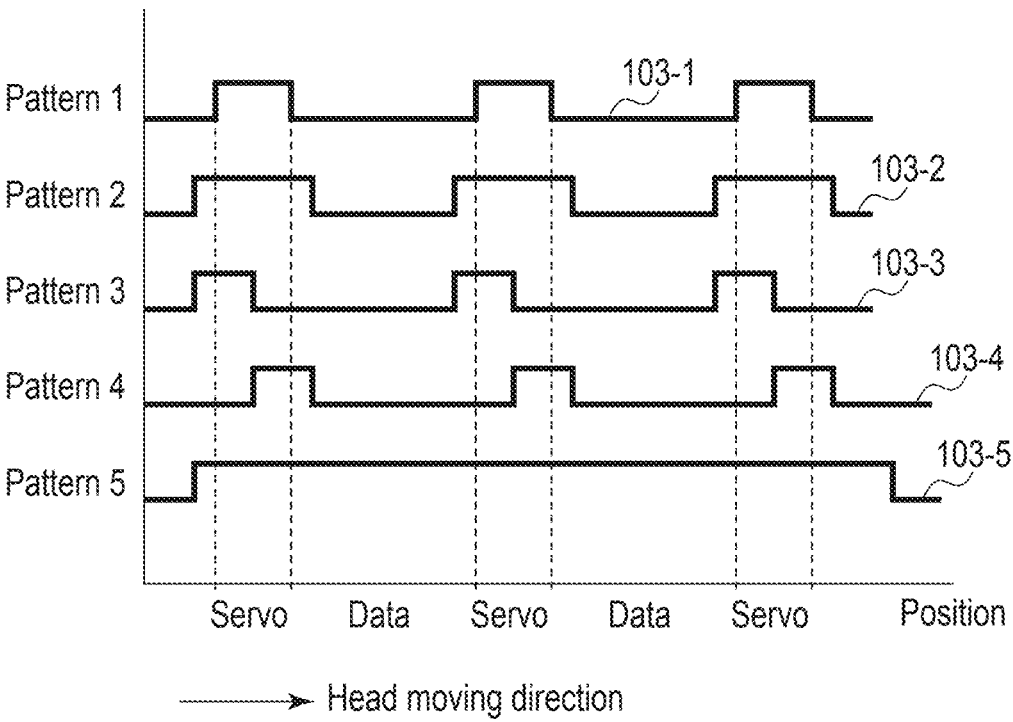
F I G. 11

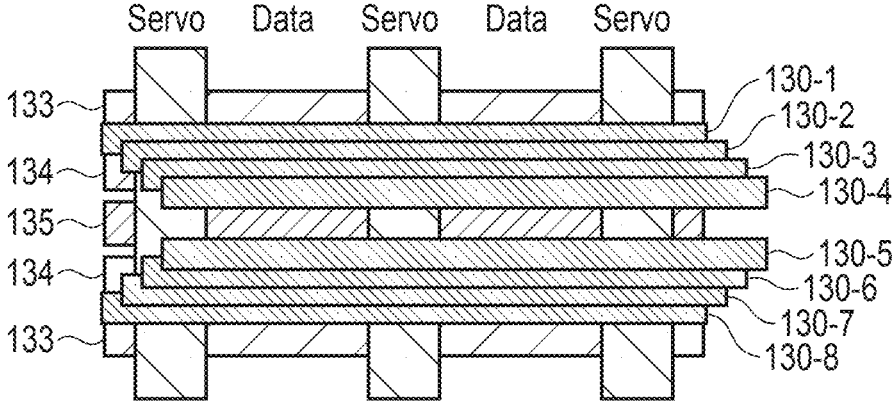
F I G. 14
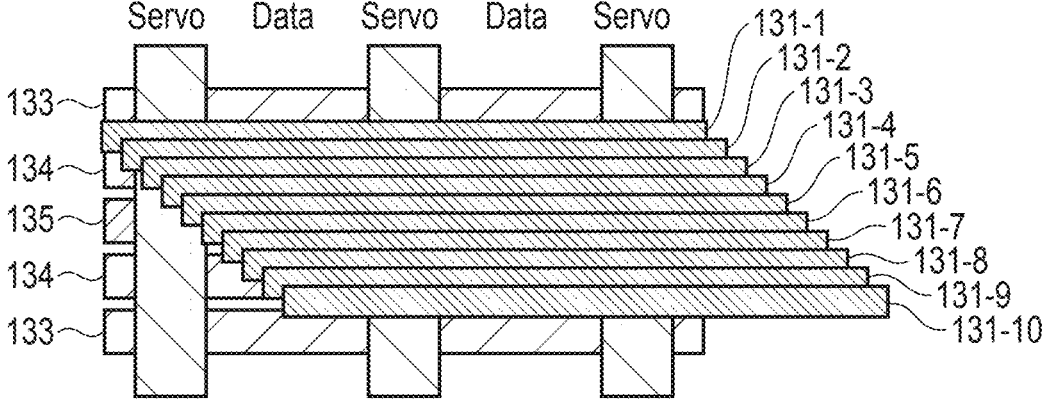
F I G. 15

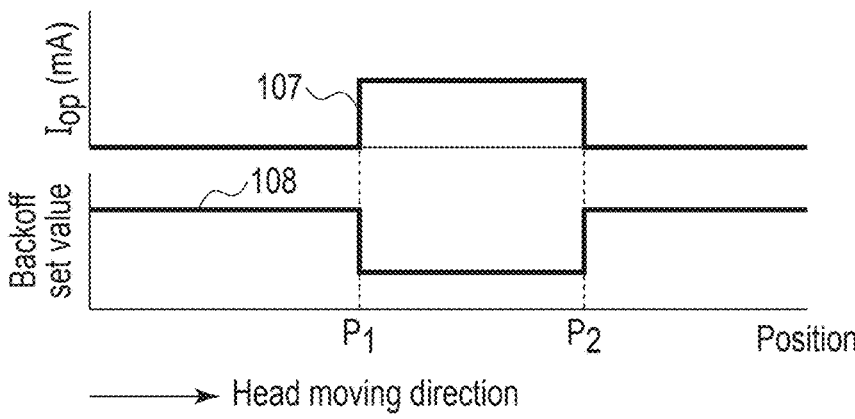
F I G. 16
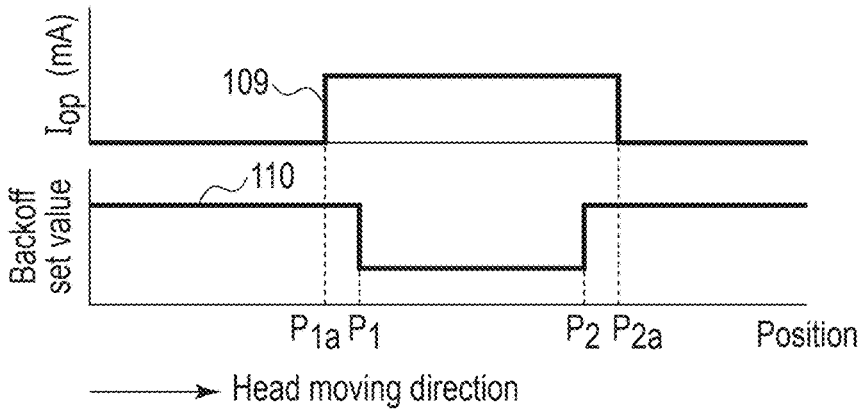
F I G. 17
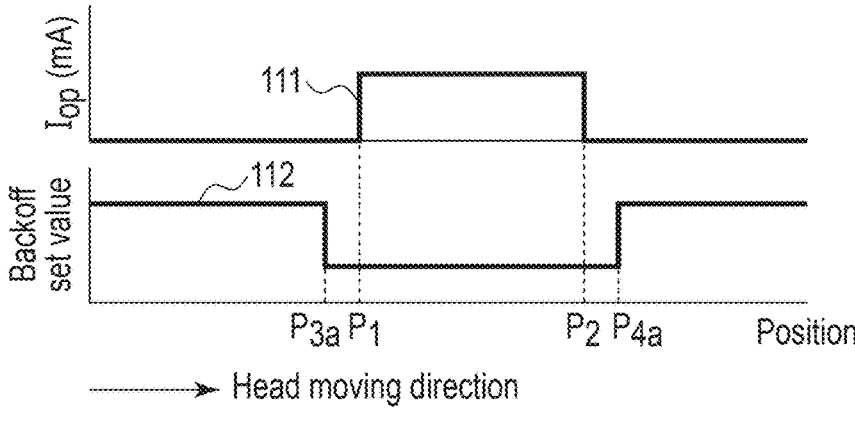
F I G. 18

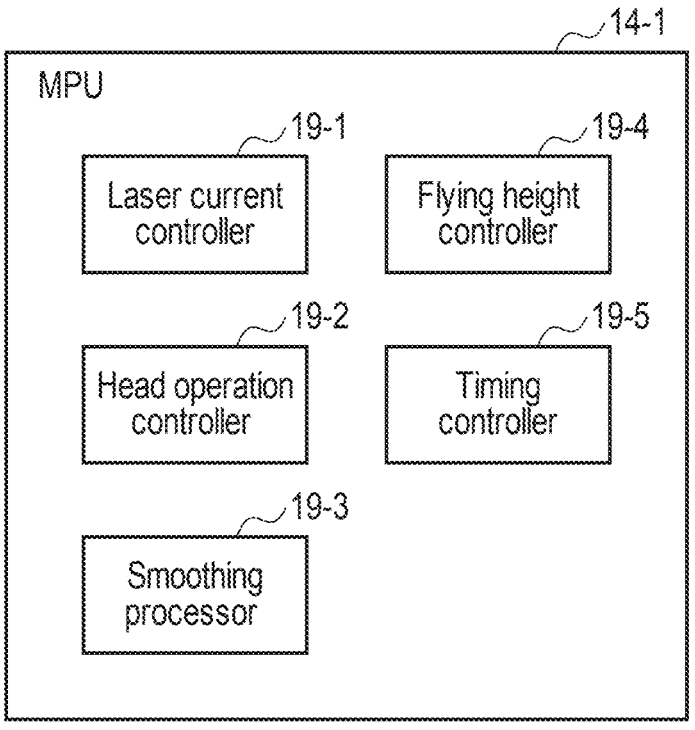
F I G. 19

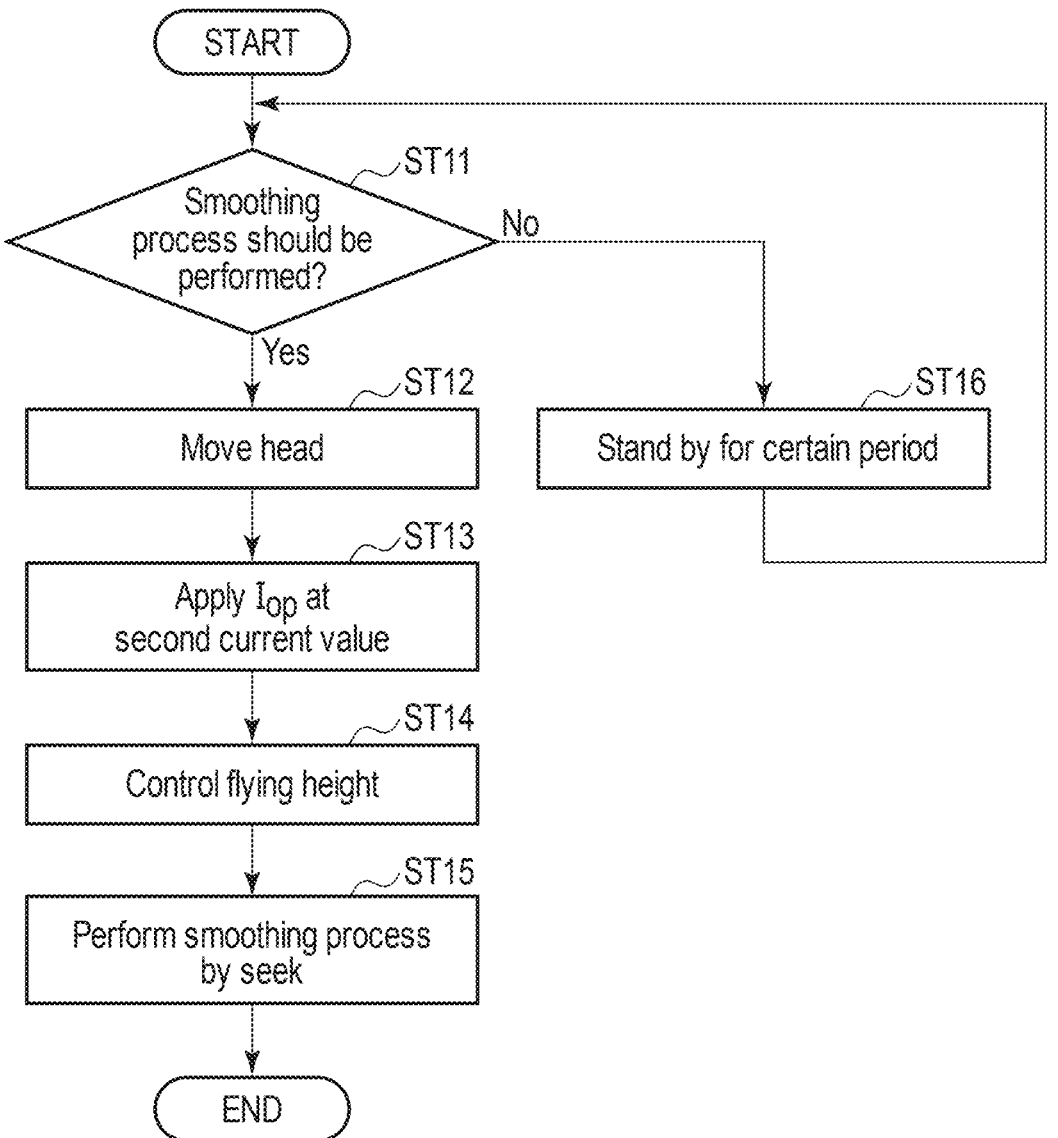
F I G. 20

MAGNETIC RECORDING AND REPRODUCTION DEVICE AND CONTROL METHOD OF THE SAME

CROSS-REFERENCE TO RELATED APPLICATIONS

This application is based upon and claims the benefit of priority from Japanese Patent Application No. 2024-117924, filed Jul. 23, 2024, the entire contents of which are incorporated herein by reference.

FIELD

Embodiments described herein relate generally to a magnetic recording and reproduction device and a control method therefor.

BACKGROUND

In heat-assisted magnetic recording, the temperature of the magnetic recording medium is raised by near-field light emitted from a near-field light output device arranged on the head, to carry out recording. The temperature of the magnetic recording medium rises to around the Curie temperature, that is, for example, up to 400° C., which may affect the operation of the lubricant layer provided on the surface of the magnetic recording medium. Specifically, in the data area, the temperature of the lubricant layer rises, making it easier for the lubricant to move, while in the servo area, no recording is performed, and therefore the temperature of the lubricant layer falls and the lubricant does not move. As a result, it has been found that there is a risk of a step of several angstroms in the radial direction occurring between the data area and servo area of the lubricant layer. Further, there is also a risk that similar steps of several angstrom levels may occur in the cross-track direction, like ruts. Such unevenness in the lubricant layer can cause signal quality to deteriorate due to fluctuation in the flying height, and also cause head operation failure due to smearing. Deterioration in signal quality can lead to a degrading in the bit error rate, and head operation failure can cause errors when recording. Thus, there is an object to achieve, that is, to reduce the unevenness of the lubricant layer.

BRIEF DESCRIPTION OF THE DRAWINGS

FIG. 1 is a block diagram showing a configuration example of a magnetic recording and reproduction device according to a first embodiment.

FIG. 4 is a partially transverse cross-sectional view showing the magnetic recording and reproduction device according to the first embodiment.

FIG. 5 is a flow diagram showing an example of a control method of the magnetic recording and reproduction device according to the first embodiment.

FIG. 10 is a graph showing data SNR when $I_{op}$ is changed.

FIG. 11 is a diagram schematically showing a pattern of performing the smoothing process per track.

FIG. 14 is a diagram schematically showing another example of the smoothing process in the cross-track direction.

FIG. 15 is a diagram schematically showing still another example of the smoothing process in the cross-track direction.

FIG. 16 is a diagram showing a pattern of applying laser current in a direction of head movement and controlling the flying height.

FIG. 17 is a diagram showing a pattern of applying laser current in a direction of head movement and controlling the flying height.

FIG. 18 is a diagram showing a pattern of applying laser current in a direction of head movement and controlling the flying height.

FIG. 19 shows a block diagram of another example of an MPU that can be used in the magnetic recording and reproduction device of the first embodiment.

FIG. 20 is a flow diagram showing another example of a control method for the magnetic recording and reproduction device of the first embodiment.

DETAILED DESCRIPTION

Figure 2:
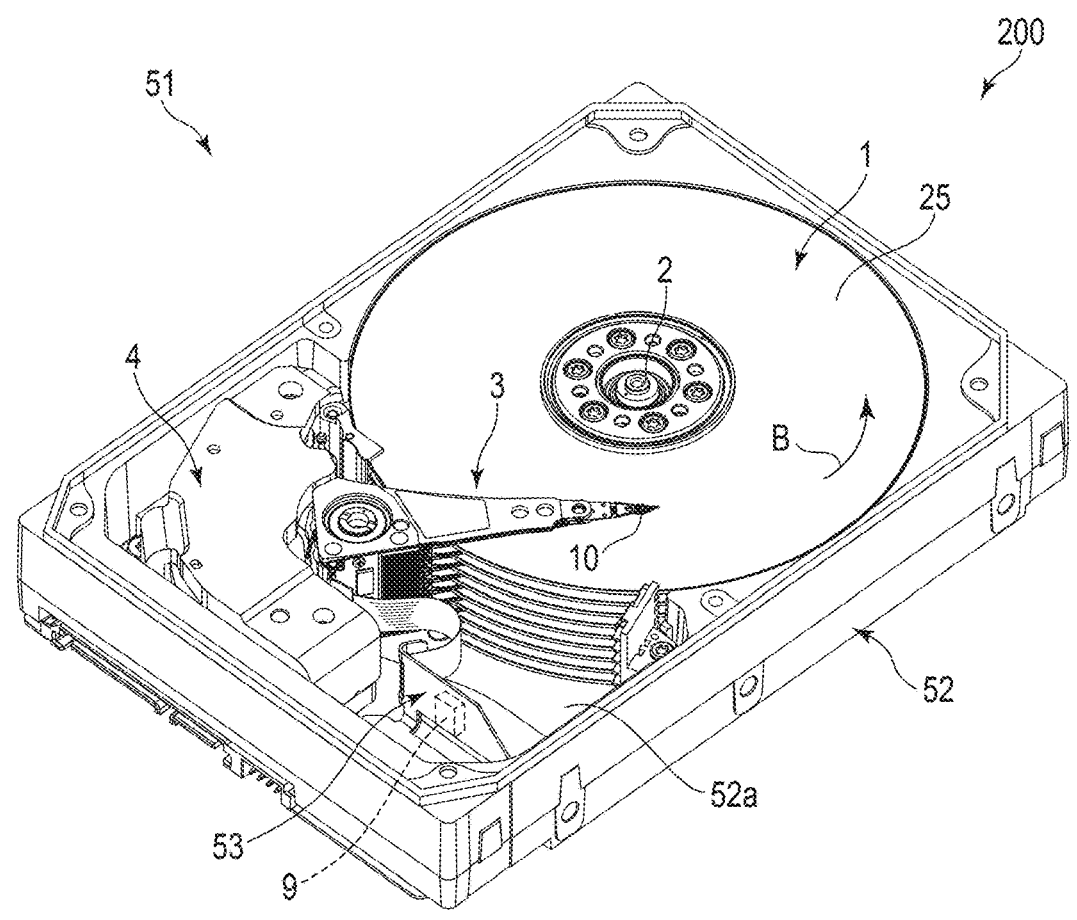
FIG. 2 is a partially exploded perspective view showing the magnetic recording and reproduction device according to the first embodiment.

In general, according to one embodiment, a control method for a heat-assisted magnetic recording and reproduction device comprises setting a second laser current value lower than a first laser current value at a time of write and performing a smoothing process on a surface of the lubricant layer using a heat-assisted magnetic recording head. The smoothing process is carried out by operating the heat-assisted magnetic recording head on the surface of the lubricant layer while irradiating the near-field light thereon at the second laser current value. The heat-assisted magnetic recording and reproduction device used here comprises a magnetic recording head comprising a main pole, an near-field transducer which generates near-field light, a waveguide which propagates light to the near-field transducer, and a laser light source which supplies light to the waveguide, and a heat-assisted magnetic recording medium comprising a lubricant layer on a recording surface thereof which opposes the heat-assisted magnetic recording head.

According to a second aspect of the embodiments, a heat-assisted magnetic recording and reproduction device comprises a heat-assisted magnetic recording head, a heat-assisted magnetic recording medium comprising a lubricant layer on a recording surface thereof which opposes the heat-assisted magnetic recording head, a laser current controller which controls a laser current to be applied to the laser light source, a head operation controller which controls operation of the heat-assisted magnetic recording head, and a smoothing processor which performs a smoothing process on a surface of the lubricant layer by applying the laser current to the laser light source at a second laser current value which is lower than the first laser current value at the time of write, and operating the heat-assisted magnetic recording head while irradiating the near-field light onto the heat-assisted magnetic recording medium. The heat-assisted magnetic recording head comprises a main magnetic pole, a near-field transducer which generates near-field light, a waveguide which propagates light to the near-field transducer, and a laser light source which supplies light to the waveguide.

According to the control method for a heat-assisted magnetic recording and reproduction device of the first aspect of the embodiments, and the heat-assisted magnetic recording and reproduction device of the second aspect, the smoothing process is performed on a surface of the lubricant layer by operating the heat-assisted magnetic recording head at the second laser current value. Thus, steps on the lubricant layer on the surface of the heat-assisted magnetic recording medium can be suppressed, thereby making it possible to reduce the occurrence of errors during recording or reproduction of data. Note that the operation of the heat-assisted magnetic recording head includes, for example, seek operation or write operation of the head.

Embodiments will now be described with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

First, a configuration example of a disk drive according used in one embodiment will be described with reference to FIG. 1. Note that the configuration of the disk drive shown in FIG. 1, which is a magnetic recording and reproduction device, is also applicable to each of the embodiments described below.

As shown in FIG. 1, a disk drive 200 is a magnetic disk drive of a perpendicular magnetic recording scheme, in which a magnetic disk 1 that is a perpendicular magnetic recording medium and a magnetic head 10 containing a magnetic flux control layer, which will be described later.

FIG. 2 is a partially exploded perspective view showing the magnetic recording and reproduction device.

FIG. 2 illustrates a state in which a plurality of magnetic disks 1 and a plurality of magnetic heads 10 are housed in a housing 51 in the magnetic recording and reproduction device, and a lid portion is omitted.

The disks 1 are fixed to a spindle motor (SPM) 2 and mounted to make rotational motion. A lubricant layer 25 is provided on the surface of each disk 1. The magnetic heads 10 are mounted on an actuator 3 and are configured to move in a radial direction on the disks 1. The actuator 3 is driven to rotate by a voice coil motor (VCM) 4. The magnetic head 10 comprises a write head 10W, a read head 10R, and a thermal assist unit 100. The write head 10W writes data to the magnetic disk 1. The read head 10R reads data from the magnetic disk 1. The thermal assist unit 100 assists in writing data when the write head 10W writes data to the magnetic disk 1. The magnetic head 10 can include one or more magnetic heads.

Further, the disk drive includes a head amplifier integrated circuit (hereinafter referred to as a head amplifier IC) 11, a read/write channel (R/W channel) 12, a hard disk controller (HDC) 13, a microprocessor (MPU) 14, a driver IC 16, and a memory 17. The R/W channel 12, the HDC 13, and the MPU 14 are incorporated into a controller 15, which consists of a single-chip integrated circuit.

Furthermore, the head amplifier IC 11 contains a circuit group for driving a laser diode for thermal assist, as described below. Moreover, the head amplifier IC 11 contains a driver that supplies to the recording head 10W a recording signal (write current) corresponding to the write data supplied from the R/W channel 12. In addition, the head amplifier IC 11 also contains a read amplifier (preamplifier) that amplifies the read signal output from the reproducing head 10R and transmits the read signal to the R/W channel 12.

The R/W channel 12 is a signal processing circuit of the read/write data. The HDC 13 constitutes an interface between the disk drive and a host 18, and executes transfer control of the read/write data.

The MPU 14 is a main write operation controller of the disk drive and executes servo control necessary for controlling read/write operations and positioning the magnetic head 10. Further, the MPU 14 includes a laser current controller 19-1 which can control the laser current applied to the laser light source 32 to a second laser current value lower than the first laser current value at the time of write, a head operation controller 19-2 which can control the operation of the magnetic recording head 10, and a smoothing processor 19-3 which performs smoothing process for the surface of the lubricant layer 25 by applying the laser current to the laser light source 32 at the second laser current value and operating the heat-assisted magnetic recording head 10 while irradiating the near-field light onto the heat-assisted magnetic recording medium 1.

The memory 17 contains a buffer memory made up of DRAM, a flash memory and the like. Further, it can include a system area region of the magnetic recording medium.

Figure 3:
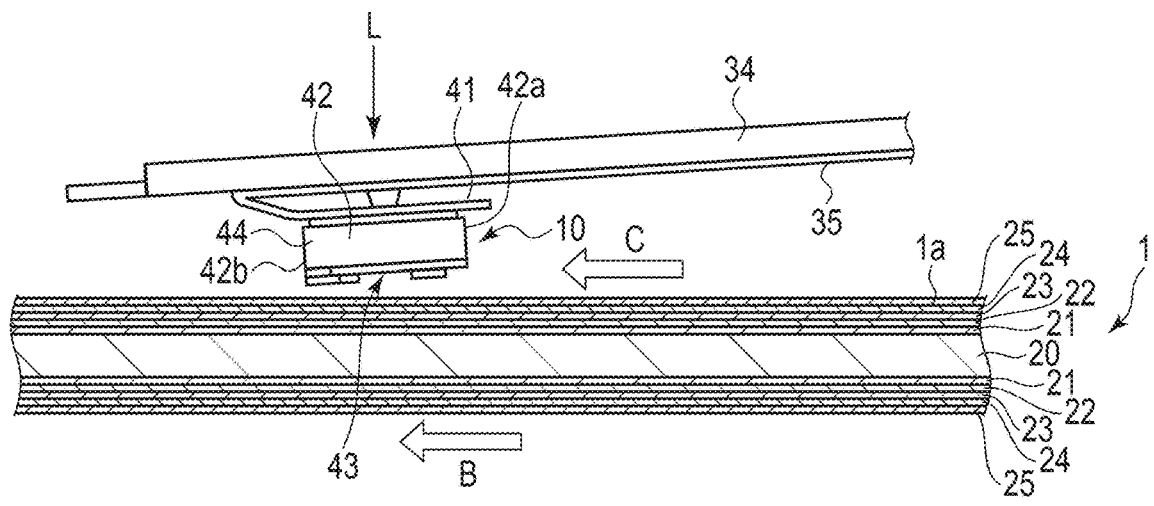
FIG. 3 is a side view showing a magnetic recording medium, a magnetic head and a suspension.

FIG. 3 is a side view showing the magnetic head 10 and a suspension.

As shown in FIG. 3, each magnetic head 10 is constituted as a flying head, and includes a slider 42 having a shape of a substantially rectangular parallelepiped and a recording and reproduction head unit 44 provided at an outflow end (trailing end) of the slider 42. The magnetic head 10 is secured to a gimbal spring 41 provided at an end portion of a suspension 34. A head load L toward the surface of the magnetic disk 1 is applied to each magnetic head 10 by the elasticity of the suspension 34. As shown in FIG. 2, each magnetic head 10 is connected to a head amplifier IC 11 and an HDC 13 via the suspension 34 and a wiring member (flexure) 35 fixed on the arm.

Next, the structure of the magnetic disk 1 and the magnetic head 10 will be described in detail.

FIG. 4 is a transverse cross-sectional view showing the write head 10W and magnetic disk 1, which are parts of the magnetic recording and reproduction drive.

The magnetic disk 1 includes a substrate 20, a heat sink layer 21, a crystal orientation layer 22, a perpendicular recording layer 23, and a protective film 24 having a surface coated with a lubricant 25, which are stacked in order on the substrate 20. The perpendicular recording layer 23 has a large anisotropy perpendicular to the disk surface. The crystal orientation layer 22 is arranged under the perpendicular recording layer 23 to improve the orientation of that perpendicular recording layer 23. The heat sink layer 21 is arranged under the crystal orientation layer 22 to suppress the spread of the heating area. The protective film 24 is arranged on an upper part of the perpendicular recording layer 23 to protect the perpendicular recording layer 23.

The magnetic head 10 is a separated magnetic head in which the recording head 10W and the reproducing head 10R are separated, and the recording head 10W is composed of a main magnetic pole 40 formed of a high permeability material that generates a magnetic field perpendicular to the disk surface, a trailing yoke 50 magnetically bonded to the main magnetic pole that flows a magnetic flux to the main magnetic pole 40, a return shield magnetic pole 60 provided to efficiently close a magnetic path directly under the main magnetic pole, which is arranged on a leading side of the main magnetic pole 40, a coil 70 arranged to wrap around the magnetic path including the trailing yoke and the return shield magnetic pole to pass the magnetic flux to the main magnetic pole 40, a heater 80 for controlling the height of flying of the recording head, a near-field transducer 30 that generates near-field light to heat the perpendicular recording layer 23 of the magnetic recording medium 1 on the leading side of the main magnetic pole 40, and a waveguide 31 that propagates the light for generating the near-field light. A light source is incorporated such that a laser diode 32 is mounted on a slider of the actuator assembly 3. The near-field transducer 30 can be formed of, for example, Au, Pd, Pt, Rh, or Ir, or an alloy consisting of a combination of some of these. An insulating layer between the main magnetic pole and the near-field transducer can be formed of, for example, an oxide of $SiO_2$, $Al_2O_3$, or the like.

Recording methods for heat-assisted magnetic recording that can be used in the magnetic recording and reproduction device 200 include so-called Conventional Magnetic Recording (CMR) for writing data in tracks at intervals in the radial direction and performing recording such that adjacent tracks do not overlap, so-called Shingled Magnetic Recording (SMR) including tracks stacked in order in the radial direction and recording over parts of the adjacent tracks, or so-called Interlaced Magnetic Recording (IMR) including a bottom track and a top track in which adjacent tracks are stacked alternately and, after recording on the bottom track, recording while stacking the bottom track on the interlaced top track, or a combination of these methods.

FIG. 5 is a flow diagram showing a control method for the magnetic recording and reproduction device according to the first embodiment.

As shown in FIG. 5, in the control method for the magnetic recording and reproduction device of the first embodiment, a smoothing process is performed at a required timing by the smoothing processor 19-3. First, the smoothing processor 19-3 determines whether the smoothing process should be performed (ST1). When the smoothing process should be performed, the laser current value is set to a second laser current value lower than the first laser current value at the time of write, in accordance with the laser current controller 19-1 (ST2). Next, while irradiating the near-field light at the second laser current value, the heat-assisted magnetic recording head is operated onto the area to be subjected to the smoothing process according to the head controller 19-2 and thus the smoothing process of the lubricant layer surface is performed (ST3). When the smoothing process is not to be performed, the operation stands by for a certain period of time (ST2) and return to the determination of ST1.

This smoothing process is performed to eliminate unevenness such as steps which have been formed on the surface of the lubricant layer.

Figure 6:
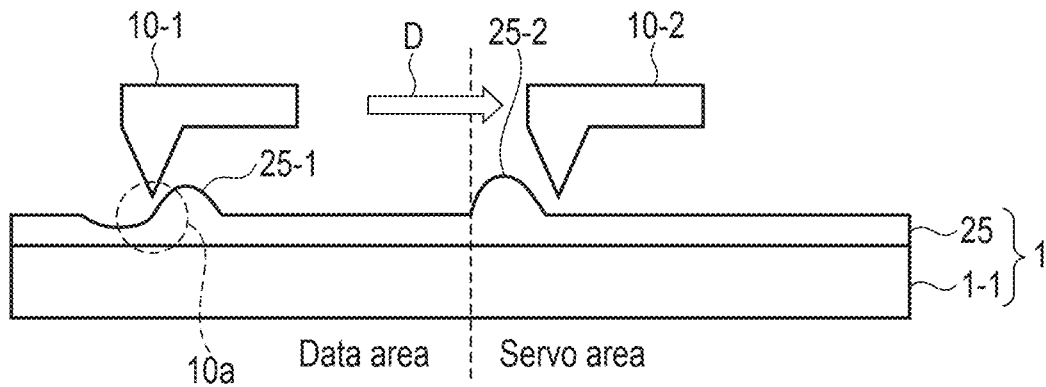
FIG. 6 is a model diagram showing part of a step of a lubricant layer.

FIG. 6 is a model diagram showing a part of the step on the lubricant layer.

Figure 7:
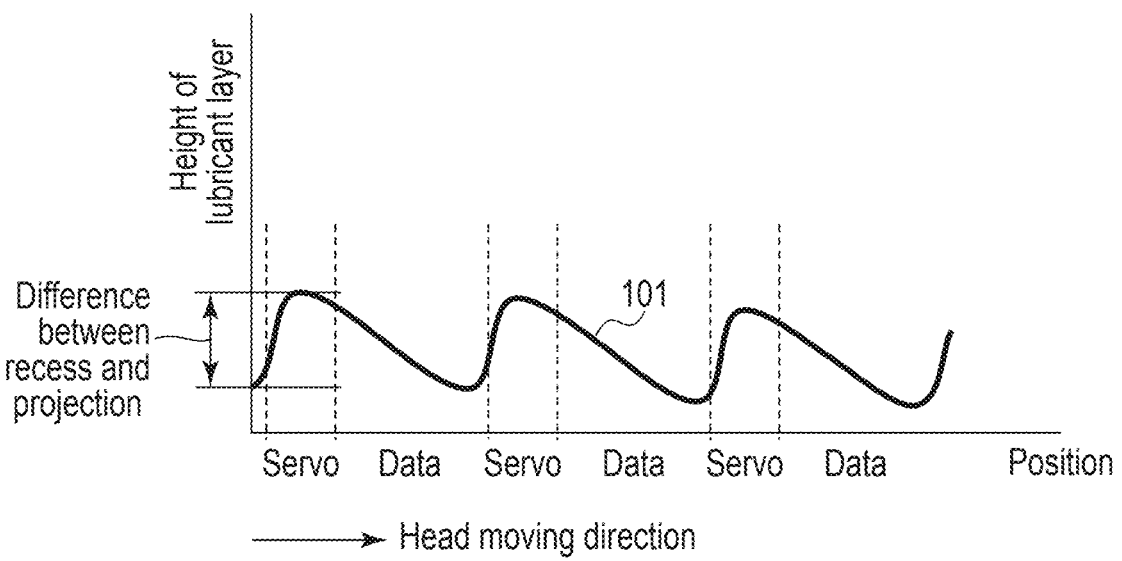
FIG. 7 is a graph showing an example of non-uniformity of the lubricant layer.

FIG. 7 shows a graph that represents an example of unevenness in the lubricant layer.

For example, as shown in FIG. 6, when the first laser current is applied in the down-track direction indicated by an arrow D, the lubricant, which has become easier to move in the area 10a by the heat due to the irradiation of the near-field light, moves on the surface of the lubricant layer, thereby creating a step 25-1. In the data area, the step 25-1 moves in accordance with the movement of the head indicated by the arrow D. On the other hand, in the servo area, no recording is performed, and therefore the lubricant, which is no longer being heated, hardens, thus creating a step 25-2. In the heat-assisted magnetic recording, due to this step 25-2 in the lubricant, unevenness such as projections and recesses indicated by a curve 101 as shown in FIG. 7 is created on the surface of the lubricant layer from the servo area to the data area. The difference in height between the projections and recesses is approximately 1 to 10 angstroms, and such unevenness on the surface of the lubricant layer tends to cause deterioration in signal quality due to fluctuations in the flying height and head operation failure due to smearing.

Figure 8:
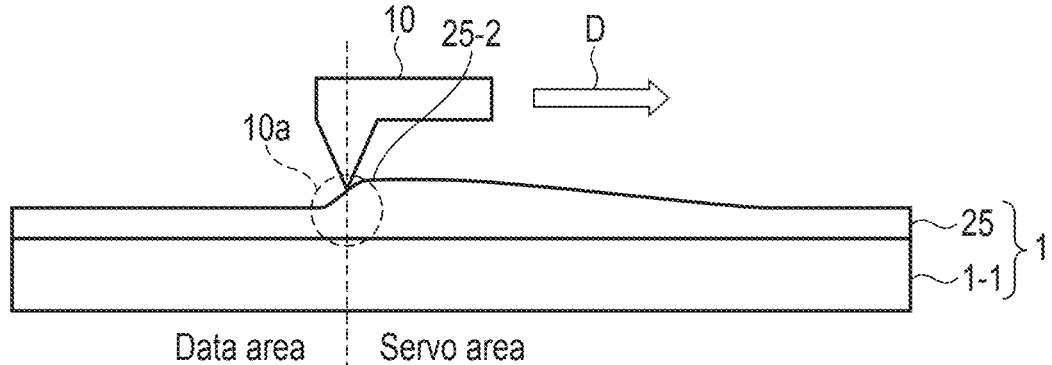
FIG. 8 is a model diagram showing an example of a smoothing process for the lubricant layer.
Figure 9:
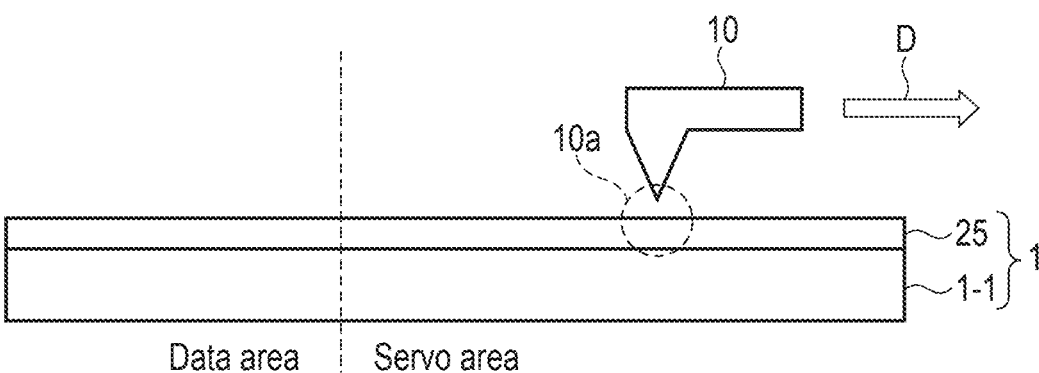
FIG. 9 is a model diagram showing an example of the smoothing process for the lubricant layer.

FIGS. 8 and 9 each show a model diagram of an example of the smoothing process for the lubricant layer.

In the smoothing process for the lubricant layer, as shown in FIG. 8, the near-field light is irradiated by setting the flying height of the heat-assisted magnetic recording head 10 to the height at the time of write, and setting the laser current value to a second laser current value, which is lower than the first laser current value at the time of write, the heat-assisted magnetic recording head 10 is operated in the track direction indicated by the arrow D while heating the lubricant layer in area 10a within the area where the step 25-2 is expected to be created. Here, the head 10 is operated at the boundary between the data area and the servo area as the expected area. The boundary between the data area and the servo area can include, for example, a distance equivalent to one bit advancing from the boundary between the data area and the servo area towards the servo area. Further, other areas are, for example, an area that includes the servo area, and an area that includes the servo area and its front and rear portions thereof by 20% of the length thereof on both sides. As shown in FIG. 9, when smoothing process is performed, the step 25-2 in the heated area 10a is smoothed.

In the embodiment, during the smoothing process, the laser current is set to the second laser current value that is lower than the first laser current value at the time of write.

The laser current value is usually controlled by setting the pre-amplifier current value. The energy supplied to the laser diode (LD) is defined by the following formula (1).

$$I_{total} = I_{th} \text{ (or } I_B) + I_{eff} \text{ (or } I_{op}) \tag{1}$$

In the formula, $I_{total}$ represents the total current of the pre-amplifier current, $I_{th}$ represents the threshold current, $I_B$ represents the bias current, $I_{eff}$ represents the effective current, and $I_{op}$ represents the operating current.

Even if a current is applied, the laser will not oscillate until it reaches up to $I_{th}$, but when the current exceeds $I_{th}$, near-field light is generated by a portion which exceeds $I_{th}$, that is, $I_{eff}$, and the magnetic recording layer is heated. Note that $I_{th}$ varies depending on temperature and individual differences, and therefore in a magnetic recording and reproduction device, the $I_{th}$ is held as the parameter of the device, that is, $I_B$, and the laser current can be controlled by changing the $I_{op}$ as the $I_{total}-I_B=I_{op}$, which is equivalent to the $I_{eff}$.

The steps on the lubricant layer can be created in the down-track and cross-track (radial) directions of the magnetic recording medium. The control method of the magnetic recording and reproduction device of the embodiment can be used for smoothing process for steps generated in either direction.

The steps on the lubricant layer in the down-track direction can be created between, for example, the servo and data, as shown in FIGS. 8 and 9. To smooth out the steps in the down-track direction on the lubricant layer, the flying height of the head is set to a level close to the height at the time of write, and it is moved over the area where the projections and recesses in the lubricant are expected to be present. At this time, at least in the portions where the lubricant is projecting, the lubricant can be heated by irradiating near-field light thereon. However, when the same laser current value as that of the time of write is used, there is a risk of erasing the data and servo patterns that have already been recorded. In order to avoid this, in the control method for the heat-assisted magnetic recording and reproduction device according to the embodiment, the laser current value is set to a second laser current value that is lower than the first laser current value at the time of write, and the near-field light is irradiated. Note that the second laser current value can be set to 80% or less of the first laser current value. Further, the second laser current value can also be set to a value higher than or equal to that of the threshold current It.

FIG. 10 is a graph diagram showing data SNR when $I_{op}$ is changed.

In the figure, a curve 102 indicates the relationship between $I_{op}$ and SNR. Here, 100% of $I_{op}$ is set based on the $I_{op}$ value adjusted so that the ADC becomes its maximum as a reference value. From the curve 102, it can be seen that there is a sufficient drop in SNR when $I_{op}$ is 80% or less, and that the operation can be carried out without causing any problem to the servo quality. It can be seen further that the adverse can be further minimized by reducing $I_{op}$ to 70% or less.

FIG. 11 is a diagram schematically showing a pattern for carrying out a smoothing process per track.

The area for carrying out a smoothing process per track can include at least the servo area where the lubricant is projecting. For example, a pattern 1 represented by a line 103-1 indicates a position where smoothing is performed only in the servo area. A pattern 2 represented by a line 103-2 indicates a position where smoothing is performed to be slightly extended over to the front and rear to the servo area. In addition, as shown by a pattern 3 represented by a line 103-3, it is also effective to perform the smoothing process in locations that interpose an upstream-side boundary of the servo/data area with respect to the head movement direction, where there is fluctuation in the unevenness of the lubricant. Further, as shown by a pattern 4 represented by a line 103-4, it is also effective to perform the smoothing process in locations that interpose an downstream-side boundary of the servo/data area with respect to the head movement direction, where there is fluctuation in the unevenness of the lubricant. Furthermore, as shown by a pattern 5 represented by a line 103-5, the smoothing process can be performed continuously over the entire area of one track.

On the other hand, steps in the lubricant layer in the cross-track direction can be formed on both sides of the track, for example. Further, the smoothing process for the lubricant layer in the cross-track direction can be performed in the data area.

Figure 12:
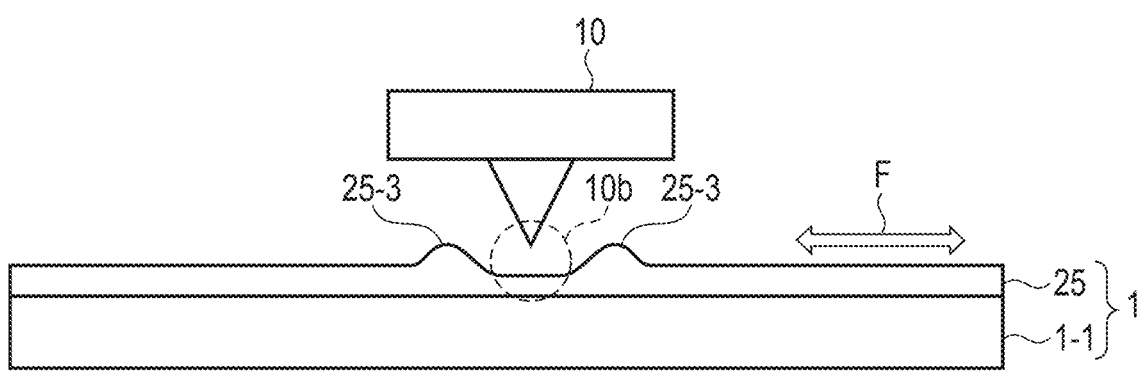
FIG. 12 is a schematic diagram showing an example of the step in the lubricant layer between cross tracks.

FIG. 12 is a schematic diagram illustrating an example of a step in the lubricant layer between cross-tracks.

As shown in FIG. 12, for example, when a plurality of write operations are carried out on the same track within a short period of time by a heat-assisted magnetic recording head 10, the lubricant, which has become easier to move in the area 10*b* heated by the irradiation of near-field light, moves in the cross-track direction represented by the arrow F in the track subjected to write, and a step 25-3 of the lubricant may be created along the track, causing a dent in the track. In this case, the smoothing process can be performed around the area containing the projecting step 25-3.

In order to smooth the lubricant layer, the flying height of the head is set close to a level of the height at the time of write, and the head is moved over the area where the lubricant is expected to be uneven. At this time, at least the part of the lubricant, which projects can be heated by irradiating near-field light thereto. But, when the same laser current value at the time of write is used, there is a risk of erasing the data and servo patterns that have already been recorded. For this reason, in the control method for the heat-assisted magnetic recording and reproduction device of the embodiment, the laser current value is set to the second laser current value that is lower than the first laser current value at the time of write, and the near-field light is irradiated. The second laser current value can be set to 80% or less of the first laser current value.

Figure 13:
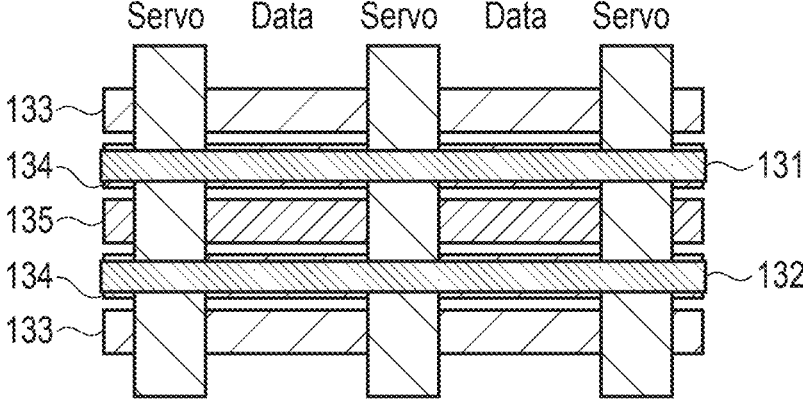
FIG. 13 is a diagram schematically showing an example of the smoothing process in the cross-track direction.

FIG. 13 is a diagram schematically showing an example of the smoothing process in the cross-track direction.

FIG. 14 is a diagram schematically showing another example of the smoothing process in the cross-track direction.

FIG. 15 is a diagram schematically showing still another example of the smoothing process in the cross-track direction.

In the figures, a track 135 is a track where a dent is formed by the movement of the lubricant layer in the cross-track direction. Tracks 134 on both sides of the track 135 are each a track where a projection is formed by the movement of the lubricant layer from track 135. A track 133 is a track in the standard state.

Smoothing Process 1 in Cross-Track Direction

For the process of eliminating the step between cross tracks, for example, as shown in FIG. 13, the smoothing process can be performed using a process pattern in such a way that the head is moved to trace over the track (adjacent track to the dent) where the lubricant has been made project, while irradiating the near-field light with the second laser current value that is set lower than the first laser current value at the time of write. In this case, the smoothing process can be performed in such a state that the center position of the near-field transducer is located within the track.

Smoothing Process 2 in Cross-Track Direction

Further, as shown in FIG. 14, the offset function is applied to the center position of the track 135 and the write setting of the track 135 so as to cover the part that is projecting the most, and the offset value of the adjacent track 135 is changed little by little, and thus, the write is executed in the processing patterns indicated by 130-1, 130-2, 130-3, and 130-4, from the outside to the inside in order, or in a similar manner, the head can be moved to the adjacent track by gradually changing the offset value of the other adjacent track 135, in the order from the outside to the inside in the processing patterns indicated by 130-8, 130-7, 130-6, and 130-5. At this time, the laser current value is set to the second laser current value lower than the first laser current value used at the time of write, and the near-field light is irradiated. In the smoothing process 2, the smoothing process can be performed at the center position of the track and in a state that the near-field transducer is offset in a side direction from the center position of the track.

Smoothing Process 3 in Cross-Track Direction

Further, as shown in FIG. 15, the offset function for the write is applied to the tracks from a track 133 on one end to the other end track 133, including the tracks 135 and 134 that are formed uneven, to change the offset value gradually, and the smoothing process can be carried out by operating the head by the processing patters of 131-1, 131-2, 131-3, 131-4, 131-5, 131-6, 131-7, 131-8, 131-9, and 131-10. In this case, the laser current value can be set to the second laser current value lower than the first laser current value at the time of write, and near-field light can be irradiated. Further, in the smoothing process 3, the smoothing process can be performed in the state where the near-field transducer is offset in the side direction from the center position of the track.

When steps are created in both the down-track direction and the cross-track direction at the same time, the above-described smoothing process can be performed on them at the same time.

Further, for the application of laser current and the position of the control of the flying height, the following patterns can be listed.

FIGS. 16, 17 and 18 are diagrams showing the patterns for applying laser current and controlling the flying height (back-off) with respective to the direction of movement of the head.

FIG. 16 shows the simplest control method, and represents the case where $I_{op}$ control and DFH (dynamic flying height) control are performed simultaneously. In the figure, a line 107 represents the $I_{op}$ control and a line 108 represents the DFH control. A position P1 represents the start position of the servo area, and a position P2 represents the end position of the servo area.

FIG. 17 shows the case where the $I_{op}$ control is applied first, then followed by DFH control, and thereafter, the $I_{op}$ control is finished after the DFH control is finished. In the figure, a line 109 represents the $I_{op}$ control and a line 110 represents the DFH control. A position P1*a* represents the position at which the laser is turned on before the servo area starts, and a position P2*a* represents the position at which the laser is turned off after the servo area starts. With this pattern, the effect of the head protrusion associated with the application of laser current can be reduced to a minimum level.

FIG. 18 shows the case where the DFH control is performed first, followed by the $I_{op}$ control, and then the DFH control is finished after the $I_{op}$ control is finished. In the figure, a line 111 represents the $I_{op}$ p control and a line 112 represents the DFH control. A position P1 represents the start of the servo area, and a position P2 represents the end of the servo area. A position P3*a* represents the position at which the back-off control value is changed before the start of the servo area. A position P4*a* represents the position at which the back-off control value is changed after the end of the servo area. With this pattern, a physical smoothing process for the lubricant layer is carried out without applying $I_{op}$ in areas where there are less projections and recesses in the lubricant layer, that is, the head is brought into contact with the surface of the lubricant layer so as to smooth the projections and recesses and only the areas with many projections and recesses are heated, thereby making it possible to conduct an effective smoothing process.

The flying height can basically be set to the same as the flying height at the time of normal write. In order to complete the smoothing process in a shorter time, the flying height can be lowered below that at the time of the normal write and the process can be carried out at a lower height. Further, to avoid damage to the head, the process can be carried out at a higher flying height, but when 0.5 nm or higher, the effect of the smoothing tends to be lower.

In actual operation, the function of a health monitor is used to record the cumulative write time for each zone, and the smoothing process is carried out each time a certain amount of time elapses. Alternatively, the smoothing process is carried out each time a certain amount of time elapses for the actual operating time. For example, at the time of idling, the smoothing process is forcibly applied to the entire surface of the lubricant layer of the magnetic recording layer, and when the read/write of data is occurring, the operation is carried out according to the operating state of the HDD, that is, for example, the smoothing process is carried out in the order from the large amount of time elapse.

For example, the smoothing process can be carried out to tracks or zones where the elapsed time of the write or the measured value of the drive time of the heat-assisted magnetic recording and reproduction device has reached a certain value or higher. Further, the smoothing process can be carried out on tracks or zones with a priority from the one with a higher measured value of the elapsed time of the write or the drive time of the heat-assisted magnetic recording and reproduction device at the time of recording or reproduction. Further, at the time of idling, the process can be performed on all areas of the write surface of the heat-assisted magnetic write medium and thus the measured values of the elapsed time of the write or the drive time of the heat-assisted magnetic recording and reproduction device can be set back to 0.

The measured values of the elapsed time of the write and the drive time can be output to the workload log and read at any time. Alternatively, the measured values of the elapsed time of the write or the drive time of the heat-assisted magnetic recording and reproduction device can be written to a NAND memory so as to be read at any time.

FIG. 19 is a block diagram showing another example of the MPU that can be used in the magnetic recording and reproduction device of the first embodiment.

FIG. 19 shows a configuration applicable to the magnetic recording and reproduction device of FIG. 1, and similar to that shown in FIG. 1 except that an MPU 14-1 is used in place of the MPU 14.

The MPU 14-1 contains a laser current controller 19-1 that can control the laser current to be applied to the laser light source 32 to the second laser current value lower than the first laser current value at the time of write, a head operation controller 19-2 that can control the head operation of the magnetic recording head 10, a flying height controller 19-4 that changes the flying height of the magnetic recording head 10 from the first flying height to a second flying height that is different from the first flying height, and a smoothing process unit 19-3 that applies the laser current to the laser light source 32 at the second laser current value and operates the heat-assisted magnetic recording head 10 while irradiating the near-field light onto the heat-assisted magnetic recording medium 1, so as to carry out the smoothing process for the surface of the lubricant layer 25, and a timing controller 19-5 that determines the timing for performing the smoothing process and controls the adjustment position of the flying height and the position for the application of $I_{op}$.

FIG. 20 is a flow diagram showing another example of the control method for the magnetic recording and reproduction device of the first embodiment.

As shown in the figure, in another example of the control method for the magnetic recording and reproduction device of the first embodiment, the pattern of the position of the $I_{op}$ application and the pattern of the adjustment position of the flying height are determined in advance and stored as device parameters. After the disk drive 200 has started running, the timing controller 19-5 periodically determines whether to perform the smoothing process according to the elapsed time from the previous smoothing process, for example once per hour (ST11). When the elapsed time from the previous smoothing process is less than that of the criteria, the operation stands by for a while (ST16), and thereafter, the operation returns to the determination in ST11. When the specified time or more has elapsed, the smoothing process unit 19-3 carries out the smoothing process for the lubricant layer. First, based on the information from the smoothing process unit 19-3, the head motion controller 19-2 moves the respective head to the respective zone or track (ST12). The laser current controller 19-1 sets the second laser current value, which is lower than the first laser current value and applies $I_{op}$ (ST13), and the flying height controller 19-4 changes the flying height to control it to the desired value (ST14). Here, depending on the settings, the order of the $I_{op}$ application (ST13) and the control of the flying height (ST14) can be reversed. After that, the head is operated with respect to the respective zone or track while the $I_{op}$ is being applied, and thus the smoothing process is carried out (ST15). At this point, the steps of the lubricant layer between the servo and data is eliminated. This operation can be performed multiple times as necessary, or it can be performed continuously on multiple tracks. As soon as the smoothing of the lubricant is complete, the operations of the $I_{op}$ and DFH is turned off and the counter for the elapsed time since the previous smoothing process is set back to 0.

For example, in the smoothing process, the flying height is adjusted to the first flying height by the flying height controller 19-4 (ST14), the laser irradiation is turned on and the $I_{op}$ is applied (ST13). Then, after the heat-assisted magnetic recording head has passed through the servo area, the laser irradiation is turned off and the $I_{op}$ application is stopped. In this manner, the flying height can be adjusted to a second flying height that is different from the first flying height.

Further, for example, in the smoothing process, the laser irradiation is turned on to apply the $I_{op}$ (ST13), and the flying height is adjusted to a low level by the flying height controller 19-4, and then, after the heat-assisted magnetic recording head has passed through the servo area, the flying height is adjusted to a high level by the flying height controller 19-4, and the laser irradiation is turned off.

Example 1

Forty HDD devices containing an HAMR head and media built therein were prepared. Of these, twenty devices were subjected to a smoothing process of the lubricant layer, while the rest of the twenty were not subjected to this process and were only run for 1000 hours. For the twenty devices that were subjected to the smoothing process, the total cumulative write time was checked once per hour during running, and the lubricant smoothing process was carried out.

The laser current value was set to the second laser current value, which is 50% of the first laser current value at the time of write.

The pattern of the position where the smoothing process is performed per track was set to the pattern 2 in FIG. 11.

The pattern for the positions of the application of the laser current and the control of the flying height (back-off) was set to the pattern shown in FIG. 16.

The bit error rate (BER) was measured before and after the test, and any device having a rate of occurrence of error exceeding 10 to the power of negative 1.8 was judged to be no good (NG). The number of NG devices before the test was 0 in both conditions. The average number of smoothing processes and the number of NG devices after the test are shown in TABLE 1 provided below. As for the twenty HDD devices that were subjected to the smoothing process, there were no NG results, but for the comparative HDD devices that were not subjected to the smoothing process, there were two NG results. After the evaluation, the devices were disassembled and the AFM observation was performed on the surrounding portion of the head. Here, it was found that the lubricant coagulated and hardened around the head, which might have prevented smooth head operation.

TABLE 1

| Operation mode | Average number of times of smoothing | NG rate after test |
|---|---|---|
| With smoothing process | 50 times/zone | 0/20 devices |
| Without smoothing process | 0 | 2/20 devices |

Example 2

Eighty HDD devices with an HAMR head and media built therein were prepared. Of these, for sixty device, the operation mode was set to smoothing processes 1 to 3 in the cross-track direction, as shown in FIGS. 13, 14 and 15, and each group of twenty devices were subjected to the respective one of these processes, while the rest of twenty devices were not subjected to the process and they were run for 1000 hours. During the running period, the write cumulative time was checked once per hour, and the lubricant smoothing process was carried out.

The bit error rate (BER) was measured before and after the test, and any device having a rate of occurrence of error exceeding 10 to the power of negative 1.8 was judged to be no good (NG). The number of NG devices before the test was 0 in both conditions. The average number of smoothing processes and the number of NG devices after the test are shown in TABLE 2 provided below. As for the twenty HDD devices that were subjected to the smoothing process, there was none or one NG result, but for the comparative HDD devices that were not subjected to the smoothing process, there were two NG results. After the evaluation, the devices were disassembled and the AFM observation was performed on the surrounding portion of the head. Here, it was found that the lubricant coagulated and hardened around the head, which might have prevented smooth head operation.

TABLE 2

| Operation mode | Average number of times of smoothing | NG rate after test |
|---|---|---|
| Smoothing process 1 | 50 times/zone | 1/20 devices |
| Smoothing process 2 | 50 times/zone | 0/20 devices |

TABLE 2-continued

| Operation mode | Average number of times of smoothing | NG rate after test |
|---|---|---|
| Smoothing process 3 | 50 times/zone | 0/20 devices |
| Without smoothing process | 0 | 2/20 devices |

Example 3

One hundred and twenty HDD devices with an HAMR head and media were prepared. Of these, one hundred devices were subjected to the smoothing process 3 in the cross track direction, and further each group of twenty devices were subjected to the respective one of the smoothing processes 1 to 5 shown in FIG. 11, by respective operation modes set thereto, while the rest of twenty devices were not subjected to the process and they were run for 1000 hours. During the running period, the write cumulative time was checked once per hour, and the lubricant smoothing process was carried out.

The bit error rate (BER) was measured before and after the test, and any device having a rate of occurrence of error exceeding 10 to the power of negative 1.8 was judged to be no good (NG). The number of NG devices before the test was 0 in both conditions. The average number of smoothing processes and the number of NG devices after the test are shown in TABLE 3 provided below. As for the HDD devices that were subjected to the smoothing process, there was none or one NG result, but for the comparative HDD devices that were not subjected to the smoothing process, there were two NG results. After the evaluation, the devices were disassembled and the AFM observation was performed on the surrounding portion of the head. Here, it was found that the lubricant coagulated and hardened around the head, which might have prevented smooth head operation.

TABLE 3

| Operation mode | Average number of times of smoothing | NG rate after test |
|---|---|---|
| Pattern 1 | 50 times/zone | 0/20 devices |
| Pattern 2 | 50 times/zone | 0/20 devices |
| Pattern 3 | 50 times/zone | 0/20 devices |
| Pattern 4 | 50 times/zone | 1/20 devices |
| Pattern 5 | 50 times/zone | 0/20 devices |
| Without smoothing process | 0 | 2/20 devices |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control method for a heat-assisted magnetic recording and reproduction device comprising a magnetic recording head comprising a main pole, a near-field transducer which generates near-field light, a waveguide which propagates light to the near-field transducer, and a laser light source which supplies light to the waveguide, and a heat-assisted magnetic recording medium comprising a lubricant layer on a recording surface thereof which opposes the heat-assisted magnetic recording head, the control method comprising:

irradiating the near-field light on the heat-assisted magnetic recording medium by applying a laser current to the laser light source with setting of a laser current value to a second laser current value lower than a first laser current value at a time of write; and operating the heat-assisted magnetic recording head to subject a surface of the lubricant layer to a smoothing process while irradiating the near-field light on the heat-assisted magnetic recording medium.

2. The control method of claim 1, wherein the smoothing process is performed in an area that includes at least a boundary between a servo area and a data area.

3. The control method of claim 1, wherein the smoothing process is performed in an area that includes at least a servo area.

4. The control method of claim 1, wherein the smoothing process is performed in an area that includes the servo area and front and following areas thereof by a length of 20% thereof.

5. The control method of claim 1, wherein the smoothing process is performed in an entire area of one track.

6. The control method of claim 1, wherein the smoothing process is performed in a data area.

7. The control method of claim 1, wherein the smoothing process is performed in a state where a center position of the near-field transducer is located in a track.

8. The control method of claim 1, wherein the smoothing process is performed in a state where the near-field transducer is offset to a side direction from a center position of a track.

9. The control method of claim 1, wherein the second laser current value is higher than or equal to a threshold current value Ith, at which the laser starts to emit light.

10. The control method of claim 1, wherein an operating current value Iop at the second laser current value is 80% or less of an operating current value Iop at the first laser current value at the time of write.

11. The control method of claim 1, wherein the smoothing process includes adjusting a flying height of the heat-assisted magnetic recording head to a flying height lower than the flying height at the time of write.

12. The control method of claim 1, wherein the smoothing process includes:

adjusting a flying height of the heat-assisted magnetic recording head to a first flying height;

setting on laser irradiation;

setting off the laser irradiation after the heat-assisted magnetic recording head passes through the servo area; and adjusting the flying height to a second flying height that is different from the first flying height.

13. The control method of claim 1, wherein the smoothing process includes:

setting on laser irradiation;

adjusting a flying height of the heat-assisted magnetic recording head to a low level;

adjusting the flying height to a high level after the heat-assisted magnetic recording head passes through the servo area; and setting off the laser irradiation.

14. The control method of claim 1, wherein the smoothing process is performed on tracks or zones for which a measured value of an elapsed time of the write or a drive time of the heat-assisted magnetic recording and reproduction device has reached or exceeded a certain value.

15. The control method of claim 1, wherein the smoothing process is performed on all areas of the recording surface of the heat-assisted magnetic recording medium at a time of idling, and resets the measured value of the elapsed time of the write or the drive time of the heat-assisted magnetic recording and reproduction device to 0.

16. The control method of claim 1, wherein the smoothing process is performed on tracks or zones with a priority from one with a higher measured value of an elapsed time of the write or a drive time of the heat-assisted magnetic recording and reproduction device at a time of recording or reproduction.

17. The control method of claim 1, further comprising:

outputting a measured value of an elapsed time of the write or a drive time of the heat-assisted magnetic recording and reproduction device to a workload log, so as to be read out at any time.

18. The control method of claim 1, further comprising:
recording a measured value of an elapsed time of the write or a drive time of the heat-assisted magnetic recording and reproduction device to a NAND memory, so as to be read out at any time.

19. A heat-assisted magnetic recording and reproduction device comprising:

a heat-assisted magnetic recording head comprising a main magnetic pole, a near-field transducer which generates near-field light, a waveguide which propagates light to the near-field transducer, and a laser light source which supplies light to the waveguide;

a heat-assisted magnetic recording medium comprising a lubricant layer on a recording surface thereof which opposes the heat-assisted magnetic recording head;

a laser current controller which controls a laser current to be applied to the laser light source;

a head operation controller which controls operation of the heat-assisted magnetic recording head; and a smoothing processor which performs a smoothing process on a surface of the lubricant layer by applying the laser current to the laser light source at a second laser current value which is lower than a first laser current value at the time of write, and operating the heat-assisted magnetic recording head while irradiating the near-field light onto the heat-assisted magnetic recording medium.

* * * * *